United States Patent Office 3,464,454
Patented Sept. 2, 1969

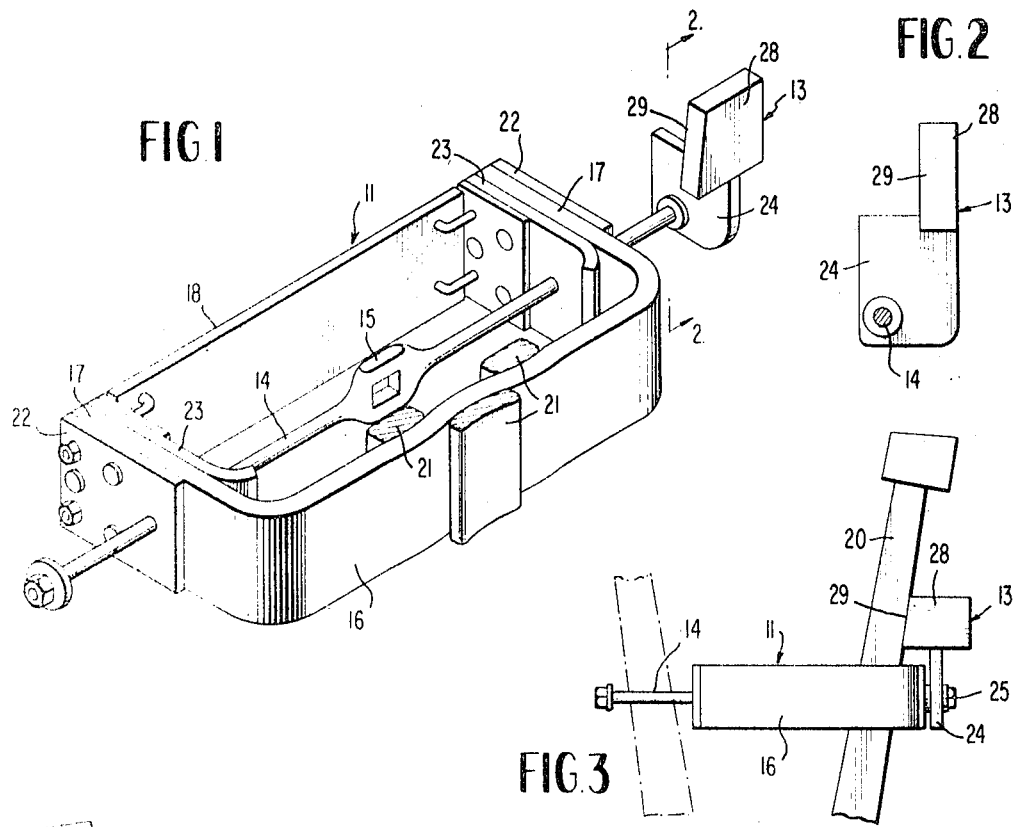
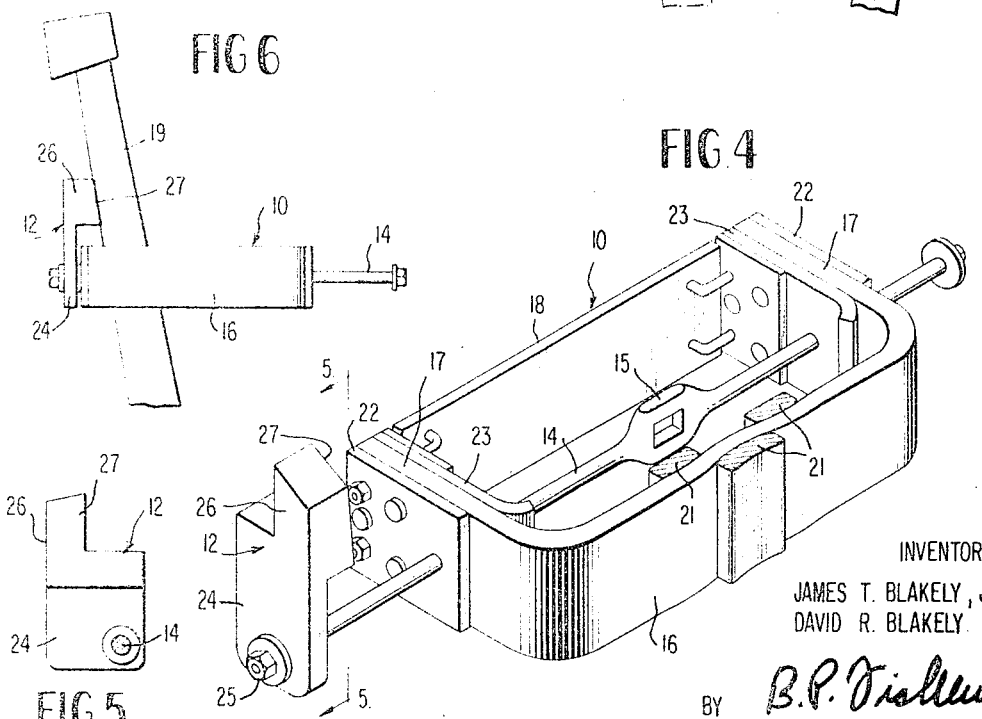

3,464,454
PICKER STICK CHECKING MEANS
James T. Blakely, Jr., and David R. Blakely, both of 3141 N. Pleasantburg Drive, Greenville, S.C. 29609
Filed July 23, 1968, Ser. No. 746,998
Int. Cl. D03d 49/40
U.S. Cl. 139—165             4 Claims

ABSTRACT OF THE DISCLOSURE

Auxiliary bumper elements are mounted directly on the check strap guide rods of the right and left hand picker stick checking units to arrest the movement of the picker stick at the end of the forward pick, thereby protecting the picker stick and eliminating excessive wear on the sliding check strap, and in general improving the operation and efficiency of the checking mechanism.

---

Numerous picker stick checking mechanisms are known in the prior art and among these one of the more successful and popular types is shown in U.S. Patents 3,114,397 and 3,228,429 to Messer. In these patents, the picker stick operates within the confines of a sliding check strap or loop sometimes called a Page check strap. The check strap is guided in its movement by a fixed guide rod, supported by a bracket means on the loom frame structure. Friction finger elements engage the check strap to resist the movement thereof under the influence of the picker stick and reinforcements are generally provided at the ends of the strap to absorb the final impact of the picker stick.

While the above arrangement is quite successful, it has been found that some damage to the picker stick occurs from contact with the metal picker stick guide and the moving check strap tends to wear excessively where it strikes the end of the guide rod on the forward pick.

The present invention overcomes the difficulties encountered with the picker stick checking means of the type under consideration by the provision of an auxiliary bumper element mounted directly upon the interior end of the right and left hand check strap guide rods to accomplish the final checking or stopping of the picker stick on the forward pick. The auxiliary bumper elements greatly lessen the wear on the check straps and prevent the picker stick from striking the end of the metal picker stick guide. The invention elements reduce the necessity for choking the action of the check strap and reduce the need for adjustment of the strap and eliminate the need for a separate bumper element within the picker stick guide, as is now frequently employed. The advantages of the invention attachment will be more clearly understood in light of the following detailed description taken in connection with the accompanying drawings.

BRIEF DESCRIPTION OF THE DRAWINGS

FIGURE 1 is a perspective view of a left hand picker stick check embodying the invention.

FIGURE 2 is a vertical section taken on line 2—2 of FIGURE 1.

FIGURE 3 is a side elevation of the left hand checking unit showing the picker stick at the forward end of its picking stroke.

FIGURE 4 is a perspective view of the right hand picker stick check embodying the invention.

FIGURE 5 is a vertical section taken on line 5—5 of FIGURE 4.

FIGURE 6 is a side elevation of the right hand checking unit showing the right hand picker stick at the forward end of its picking stroke.

DETAILED DESCRIPTION OF THE PREFERRED EMBODIMENT

Referring to the drawings in detail wherein like numerals designate like parts, the right and left hand picker stick checking units are shown generally by the numerals 10 and 11 in FIGURES 4 and 6 and 1 and 3. While these companion units are similar in construction and operation, they are not identical since the auxiliary bumper elements 12 and 13 forming the essence of the invention are specifically different in form for the right and left hand checking units 10 and 11.

Each checking unit 10 and 11 comprises a substantially rigid check strap guide rod 14 disposed horizontally during use and including a central lug 15 supported by a bracket, not shown, attached to a part of the loom frame, as is well known and described in the above-mentioned Messer patents, as well as in other prior art patents.

Each fixed guide rod 14 has associated with it a check strap 16 extending in the form of a loop spaced from one side of the guide rod 14 and including end portions 17 having openings slidably receiving the guide rod 14 therethrough. The terminal ends of portions 17 are connected by another strap element 18 to complete the loop and to stabilize the strap assembly for movement back and forth along the guide rod 14 under influence of the right or left hand picker stick 19 or 20, as the case may be. As clearly shown in the Messer patents, the picker stick oscillates between the check strap loop 16 and the adjacent side of the guide rod 14, the strap section 18 being remote from the picker stick on the opposite side of the guide rod. Friction fingers 21 customarily exert a friction braking or choking action on the check strap loop 16 to retard its back-and-forth travel on the guide rod 14 under influence of the picker stick. Reinforcing sections 22 and 23 are usually employed on opposite sides of strap portions 17 to strengthen the check strap and reduce wear from the pounding of the picker stick. These features may remain unchanged in connection with the present invention and need not be described in further detail since they are conventional.

To protect the picker sticks 19 and 20 at the forward ends of their strokes and to reduce wear on the check straps, there is provided on each guide rod 14 the aforementioned right and left hand auxiliary bumper elements 12 and 13. As stated, the elements 12 and 13 are at the inner ends of the guide rods 14, FIGURES 3 and 6, so as to engage the respective picker sticks 19 and 20 when the latter are at the extremes of their forward picking strokes.

Each bumper element 12 and 13 is unitary and formed of a solid section of leather preferably. In some instances, molded nylon or some like material may be employed. The bumper elements 12 and 13, while quite rigid, do possess a degree of resiliency so that they may absorb efficiently the final shock or impact of the picker stick. Toward this end, the elements 12 and 13 each include a relatively thin bendable web 24 disposed in a plane at right angles to the axis of the rod 14 and having an opening to receive the rod. The webs 24 are clamped tightly to the rods 14 by suitable clamping nut means 25 and do not slide or turn relative to the rod, whereas the straps 16 are freely slidable. The webs 24 extend somewhat above the check straps 16 as shown in FIGURES 3 and 6 and are adapted to flex or bend when the picker stick strikes the particular bumper element 12 or 13.

The bumper element 12 includes an enlarged head 26 having a slanting face 27 to engage the front of the picker stick 19 and the bumper element 13 also has a head 28 provided with a slanting face 29 which engages the other picker stick 20, as shown in FIGURE 3. In each case, the heads 26 and 28 are offset laterally to one side of the axis of the guide rod 14. FIGURES 2 and 5, so that the slanting faces 27 and 29 will be directly in the path of the picker stick. The final impact of each picker stick 19 and 20 is absorbed by the associated bumper element 12 or 13 and the movement of the picker stick on the forward pick is arrested before the picker stick can be damaged by striking the end of the metal guide. Most importantly, the resilient bumper element 12 or 13 greatly relieves the end portion 17 of the sliding check strap from wear which occurs excessively without the invention when the picker stick slams the strap against the stop at the end of the guide rod. The bumper elements also contribute in general to improving the efficiency of the entire check and lessen the necessity for adjusting the check strap and eliminate the need for a separate bumper in the picker stick guide. The advantages of the invention attachment should be readily apparent to those skilled in the art without further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a picker stick check for a loom, a fixed guide rod on the loom extending in the path of movement of an adjacent picker stick, a check strap connected with the guide rod and being slidable in opposite directions thereon and having the adjacent picker stick confined therein, and a bumper element secured to one end of the guide rod and including a resilient web secured directly to the guide rod and extending thereabove, and a head secured to said web at the top thereof and having a slanting face directly in the path of the picker stick when the picker stick is substantially at the forward end of its picking stroke.

2. The structure of claim 1, wherein the bumper element including said web and head is a unitary element formed of somewhat resilient material.

3. The structure of claim 2, wherein said material is leather.

4. An auxiliary bumper element mountable upon a fixed check strap guide rod of a picker stick checking mechanism, said bumper element comprising a relatively thin resilient web disposed in a plane substantially at right angles to the axis of said guide rod and having an opening adapted to receive the guide rod so that the web may be fixedly secured to the guide rod near one end thereof, and a head formed integrally with the web at the top of the web and having an inclined face in the path of the forward side of the picker stick, said head and inclined face offset laterally from one side of the axis of the guide rod and said opening, said web yielding when the forward side of the picker stick engages the inclined face and allowing the inclined face to maintain full contact with the picker stick while the bumper element is arresting the movement of the picker stick.

References Cited

UNITED STATES PATENTS

| | | | |
|---|---|---|---|
| 798,860 | 9/1905 | Allen | 139—166 |
| 984,663 | 2/1911 | Harrigan | 139—166 |
| 1,013,217 | 1/1912 | Petersen | 139—165 |
| 2,117,956 | 5/1938 | Haupt | 139—166 |
| 2,521,893 | 9/1950 | Bridges | 139—166 |
| 2,855,004 | 10/1958 | Shivell | 139—165 |
| 2,884,961 | 5/1959 | Plante et al. | 139—166 |

JAMES KEE CHI, Primary Examiner

U.S. Cl. X.R.

139—166